(12) United States Patent
Yang et al.

(10) Patent No.: US 11,408,808 B2
(45) Date of Patent: Aug. 9, 2022

(54) INTELLIGENT ROLLING CONTACT FATIGUE TESTING SYSTEM AND TESTING METHOD THEREFOR

(71) Applicants: CHONGQING HAO HAN TECHNOLOGY COMPANY LIMITED, Chongqing (CN); CHONGQING UNIVERSITY OF TECHNOLOGY, Chongqing (CN)

(72) Inventors: Yan Yang, Chongqing (CN); Hongbin Xu, Chongqing (CN); Hui Li, Chongqing (CN); Jianjun Hu, Chongqing (CN); Yu Liu, Chongqing (CN); Changhui Yang, Chongqing (CN); Gang Zhu, Chongqing (CN); Yi Wang, Chongqing (CN); Juke Liang, Chongqing (CN)

(73) Assignees: CHONGQING HAO HAN TECHNOLOGY COMPANY LIMITED, Chongqing (CN); CHONGQING UNIVERSITY OF TECHNOLOGY, Chongqing (CN)

( * ) Notice: Subject to any disclaimer, the term of this patent is extended or adjusted under 35 U.S.C. 154(b) by 514 days.

(21) Appl. No.: 16/488,604

(22) PCT Filed: May 5, 2017

(86) PCT No.: PCT/CN2017/083145
§ 371 (c)(1),
(2) Date: Aug. 26, 2019

(87) PCT Pub. No.: WO2018/201424
PCT Pub. Date: Nov. 8, 2018

(65) Prior Publication Data
US 2020/0049603 A1  Feb. 13, 2020

(30) Foreign Application Priority Data

May 4, 2017 (CN) .......................... 201710309480.3
May 4, 2017 (CN) .......................... 201720488369.0
(Continued)

(51) Int. Cl.
*G01M 13/00* (2019.01)
*G01N 3/56* (2006.01)
(Continued)

(52) U.S. Cl.
CPC ............ *G01N 3/56* (2013.01); *G01M 13/021* (2013.01); *G01M 13/04* (2013.01); *G01N 19/02* (2013.01);
(Continued)

(58) Field of Classification Search
CPC .......... G01N 3/56; G01N 19/02; G01N 19/08; G01M 13/021; G01M 13/04; G06T 7/0004; G06T 2207/30164
See application file for complete search history.

(56) References Cited

U.S. PATENT DOCUMENTS 4,452,065 A * 6/1984 Minter ..................... G01N 3/56
73/808
5,837,882 A * 11/1998 Bacigalupo ........... G01M 13/04
73/781
(Continued)

FOREIGN PATENT DOCUMENTS

CN 201051048 Y 4/2008
CN 101750259 A 6/2010
(Continued)

*Primary Examiner* — Max H Noori
(74) *Attorney, Agent, or Firm* — Gang Yu

(57) ABSTRACT

An intelligent rolling contact fatigue testing system and testing method therefor, including a main testing system (3), a loading system (4) and a subsidiary testing system (7), and further including a testing device, wherein the testing device
(Continued)

includes a light source (S3), a CCD camera (S5) and a monitoring assistance device (S2), and during testing, a roller test specimen (306) and an subsidiary testing piece (706) are provided in the monitoring assistance device (S2) after being rolled in contact with each other for a certain time, and the roller test specimen (306) and the rotating brush (S210) are rotated simultaneously in a state in which the lubricating oil is sprayed, and the CCD camera (S5) dynamically collects the surface image of the roller test specimen (306), and then performing quantization evaluation on a fatigue failure state by image preprocessing, image processing and image post-processing.

9 Claims, 12 Drawing Sheets

(30) Foreign Application Priority Data

| May 4, 2017 | (CN) | 201720488370.3 |
|---|---|---|
| May 4, 2017 | (CN) | 201720488405.3 |
| May 4, 2017 | (CN) | 201720488411.9 |

(51) Int. Cl.
*G01M 13/021* (2019.01)
*G01M 13/04* (2019.01)
*G01N 19/02* (2006.01)
*G01N 19/08* (2006.01)
*G06T 7/00* (2017.01)

(52) U.S. Cl.
CPC ........... *G01N 19/08* (2013.01); *G06T 7/0004* (2013.01); *G06T 2207/30164* (2013.01)

(56) References Cited

U.S. PATENT DOCUMENTS

| 6,427,541 | B1* | 8/2002 | Kalin | G01N 3/50 |
|---|---|---|---|---|
| | | | | 73/829 |
| 2008/0168823 | A1* | 7/2008 | Maassen | G01N 3/56 |
| | | | | 73/7 |

FOREIGN PATENT DOCUMENTS

| CN | 102266949 A | | 12/2011 |
|---|---|---|---|
| CN | 102384880 A | | 3/2012 |
| CN | 102494963 A | | 6/2012 |
| CN | 102879197 A | | 1/2013 |
| CN | 104155102 A | | 11/2014 |
| CN | 105136805 A | | 12/2015 |
| CN | 112414880 A | * | 3/2021 |
| JP | 2001013083 A | | 1/2001 |

* cited by examiner

INTELLIGENT ROLLING CONTACT FATIGUE TESTING SYSTEM AND TESTING METHOD THEREFOR

TECHNICAL FIELD

The present invention relates to the field of mechanical fatigue testing.

BACKGROUND

Rolling contact fatigue failure is one of the main causes of mechanical part failure. Statistically, more than about 80% of mechanical parts, such as shafts, gears, bearings, blades and springs, fall within contact fatigue breakage, and have no significant deformation before breakage, so fatigue breakage often causes significant accidents. Hence, accurate acquisition of material fatigue performance is one of the key ways to solve the problems of base part, base process and base material falling.

A variety of rolling contact fatigue testers satisfying different test requirements are pushed out by the domestic and outdoor related development mechanism and enterprise, but there are many disadvantages, mainly representing: device stability and reliability are not high; only a single target test is possible, and the test efficiency is low; the test environment is harsh, the person needs to have a long-term value, and the labor intensity is high, and the participation in the test environment is not high; the failure condition requires human subjective judgment after stopping, and the continuous test operation of the device cannot be realized, so that the material contact fatigue intensity data cannot be accurately acquired, thereby severely constraining the establishment of the corresponding material performance base database.

SUMMARY

The present invention aims at the problems that the existing rolling contact fatigue tester cannot quantify and evaluate fatigue failure, and cannot accurately obtain material contact fatigue data, and provides a fatigue state monitoring and quantification evaluation system based on a machine vision technology, and the system can quantify and evaluate the fatigue failure state of a roller test specimen through an image processing technology or the like, and can obtain data of the material contact fatigue failure.

The technical solution of an embodiment of the present invention is provided an intelligent rolling contact fatigue testing system, wherein mainly including a main testing system, a loading system and a subsidiary testing system.

The main testing system and the subsidiary testing system are provided on a same experimental platform.

The main testing system mainly includes a main testing system base, a main testing shaft driving servo motor, a main testing box, a main testing system moving slider, a main testing system moving rail and a main testing box base.

The main testing box mainly includes a main shaft A, two sealing end caps, a box body and a sensor race A. The main shaft A is provided in the box body by using a bearing. Two ends of the box body are closed by sealing end covers with oil sealing. Two ends of the main shaft A pass through the sealing end covers at two ends of the box body, and one end of the main shaft A connects the main testing shaft driving servo motor, and the other end of the main shaft A is provided with a roller test specimen.

The sensor race A is provided on one of the sealing end covers. An acceleration sensor is provided on the sensor race A. A bottom of the main testing box is fixed on the main testing system base. The main testing system base is provided on the main testing system moving rail by using the main testing system moving slider. The main testing system moving rail is fixed on the experimental platform. A direction of the main testing box along the main testing system moving rail to slide is perpendicular to an axial direction of the main shaft A.

The subsidiary testing system includes a subsidiary testing box, a subsidiary testing piece, a subsidiary testing box base and a subsidiary testing shaft driving servo motor.

The subsidiary testing box mainly includes a main shaft B, two sealing end caps and a box body. The main shaft B is provided in the box body by using a bearing. Two ends of the box body are closed by sealing end covers with oil sealing. Two ends of the main shaft B pass through the sealing end covers at two ends of the box body, and one end of the main shaft B connects the subsidiary testing shaft driving servo motor and the other end of the main shaft B is provided with the subsidiary testing piece. The subsidiary testing box is fixed on the experimental platform. A shape and size of the subsidiary testing piece are the same as the roller test specimen.

The loading system mainly includes a servo cylinder driven by a driving motor. A mounting base of the servo cylinder is fixed on one side of the main testing system. A pressure sensor is installed at a telescopic end of the servo cylinder. The pressure sensor is in contact with the main testing box. When the servo cylinder pushes the main testing box to move along the main testing system moving rail, the pressure sensor measures a load loaded on the main testing box. In the experiment, the loading system pushes the main testing box such that the subsidiary testing piece contacts the roller test specimen.

In an exemplary embodiment, the experimental platform includes a testing machine base. A main body part of the testing machine base is a cabinet. A lower end of the cabinet is provided with a pulley, and an upper surface of the cabinet is a main/subsidiary testing box body base. The main/subsidiary testing box body base is a horizontal platform.

In an exemplary embodiment, a box body of the main testing box includes a box cover A, a box cover plate A and a lower box body A. The lower box body A is hollow, and two ends of the lower box body A have a main shaft hole. The main shaft A, a bearing NJ314A and a bearing NJ310A are provided inside the lower box body A.

An upper end opening of the lower box body A is closed by the box cover A. the box cover A is provided with an inspection hole. The inspection hole is closed by the box cover plate A.

An outer ring of the bearing NJ314A and an outer ring of the bearing NJ310A are fixed in the lower box body A. The main shaft A passes through and is fixed on an inner ring of the bearing NJ314A and an inner ring of the bearing NJ310A.

One sealing end cap at left side of the two sealing end caps of the main testing box includes a skeleton oil seal IA and a left end cover A. A left side of the main shaft A passes through a central hole of the left end cover A. The left end cover A closes a main shaft hole on a left side of the lower box body A. One side of the left end cover A faces an inside of the main testing box is provided with the skeleton oil seal IA. The main shaft A passes through the skeletal oil seal IA.

One sealing end cap at right side of the two sealing end caps of the main testing box includes a skeleton oil seal IIA and a right end cover A. A right side of the main shaft A passes through a central hole of the right end cover A. The right end cover A closes a main shaft hole on a right side of the lower box body A. One side of the right end cover A faces an inside of the main testing box is provided with a skeleton oil seal IIA. The main shaft A passes through the skeleton oil seal IIA.

The main shaft A is provided with a roller test specimen by a shaft end connector A and a roller coupon mounting seat A. The shaft end connector A is a rotary body, which is sheathed at one end of the main shaft A by means of a keyway connection. the shaft end connector A rotates with the main shaft A. The roller coupon mounting seat A is a rotary body, and one end of the roller coupon mounting seat A is connected to an end surface of the shaft end connector A by a bolt IIIA and the other end of the roller coupon mounting seat A fixes the roller test specimen.

The box body of the subsidiary testing box includes a box cover B, a box cover plate B and a lower box body B. The lower box body B is hollow, and two ends of the lower box body B have a main shaft hole. A main shaft B, a bearing NJ314B and a bearing NJ310B are provided inside the lower box body B.

An upper end opening of the lower box body B is closed by the box cover B. the box cover B has an inspection hole. The inspection hole is closed by the box cover plate B.

An outer ring of the bearing NJ314B and an outer ring of the bearing NJ310B are fixed in the lower box body B. The main shaft B passes through and is fixed on an inner ring of the bearing NJ314B and an inner ring of the bearing NJ310B.

One sealing end cap at left side of the two sealing end caps of the subsidiary testing box includes a skeletal oil seal IB and a left end cover B. A left side of the main shaft B passes through a central hole of the left end cover B. The left end cover B closes a main shaft hole on a left side of the lower box body B. One side of the left end cover B facing an inside of the subsidiary testing box is provided with a skeletal oil seal IB. the main shaft B passes through the skeletal oil seal IB.

One sealing end cap at right side of the two sealing end caps of the subsidiary testing box includes a skeletal oil seal IIB and a right end cover B. A right side of the main shaft B passes through a central hole of the right end cover B. The right end cover B closes a main shaft hole on a right side of the lower box body B. One side of the right end cover B facing an inside of the subsidiary testing box is provided with a skeletal oil seal IIB. The main shaft B passes through the skeletal oil seal IIB.

The main shaft B is provided with a subsidiary testing piece by a shaft end connector B and a roller coupon mounting seat B. The shaft end connector B is a rotary body, which is sheathed at one end of the main shaft B by means of a keyway connection. The shaft end connector B rotates with the main shaft B. The roller coupon mounting seat B is a rotary body, and one end of the roller coupon mounting seat B is connected to an end surface of the shaft end connector B by a bolt IIIB and the other end of the roller coupon mounting seat B is fixed to the subsidiary testing piece.

In an exemplary embodiment, the intelligent rolling contact fatigue testing system further includes a control box. The subsidiary testing shaft driving servo motor and the main testing shaft driving servo motor are controlled by the control box.

In an exemplary embodiment, the intelligent rolling contact fatigue testing system further includes a lubrication system. The lubrication system includes a lubricating oil tank, an oil pump motor, an oil pump and a lubricating oil shell.

The oil pump motor drives the oil pump, so that a lubricating oil of the lubricating oil tank is drawn out, and the lubricating oil tank is provided with the lubricating oil for the main testing system, the loading system and the subsidiary testing system.

An upper end of the lubricating oil shell is open. The lubricating oil shell is located below the roller test specimen. After the lubricating oil in the lubricating oil tank is sprayed into the roller test specimen, the lubricating oil is collected into the lubricating oil shell, and the lubricating oil is reflowed to the lubricating oil tank.

A rolling contact fatigue testing method based on above the intelligent rolling contact fatigue testing system, wherein:

The intelligent rolling contact fatigue testing system includes a testing device. The testing device includes a light source, a CCD camera, and a monitoring assistance device.

The light source is an annular light source. The light source surrounds a lens barrel of the CCD camera.

The monitoring assistance device includes a box body, an oil box, a lubricating oil pipe, a vertical oil baffle plate, an inclined oil baffle plate, and a rotating brush.

The box body is consisted of a top plate, a left side plate, a rear side plate and a front side plate. an opening of lower end of the box body is fastened on the oil box.

The left side plate is provided an open pore. The CCD camera and the light source face an opening of the left side plate.

Two rotating shafts are provided on the rear side plate. The two rotating shafts are direct connected with a transmission shaft of a direct-current machine, and the two rotating shafts are simultaneously driven by the direct-current machine. The two rotating shafts respectively mount a roller test specimen and a rotating brush. The roller test specimen faces the CCD camera.

A lubricating oil shower head and a vertical oil baffle plate are provided on the top plate. The lubricating oil shower head supplies oil by the lubricating oil pipe. The vertical oil baffle plate is located above the roller test specimen, and the vertical oil baffle plate is located between the lubricating oil shower head and the left side plate. One side of the inclined oil baffle plate is connected to the rear side plate. The inclined oil baffle plate is located below the roller test specimen.

When testing, the rolling contact fatigue testing method includes following steps:

1). Using the intelligent rolling contact fatigue testing system so that the roller test specimen and the subsidiary testing piece are in contact with each other and rolling with each other. In this process, a load measured by the pressure sensor and a vibration data measured by the acceleration sensor are recorded.

2). Installing the roller test specimen in the monitoring assistance device after a testing set time is completed, and rotating the roller test specimen simultaneously with the rotating brush in a state in which the lubricating oil is sprayed.

3). Adjusting the CCD camera, and dynamically collecting a surface image of the roller test specimen.

4). Image preprocessing: after adopting an image enhancement algorithm to improve the degree of image sharpening, a bright area is determined by using a threshold algorithm, and a ROI tile is obtained by an area subtracting.

5). Image processing: using an edge template matching algorithm for whole circumferential image splicing of the roller test specimen, using a threshold algorithm to acquire a point etching hole, and performing morphology analysis on an image defect area.

6). Image post-processing: performing connected component analysis on the image defect area, selecting a point etching area according to the feature, calculating an area of the point etching area according to the camera pixel equivalent, and performing quantification evaluation on a fatigue failure state.

The technical effects of the present invention are undisputed, and an intelligent rolling contact fatigue testing system is an important equipment for investigating a key basic component fatigue failure mechanism such as a bearing, a gear and a shaft, and the present invention is directed to the existing rolling contact fatigue testing machine not being able to quantify and evaluate the existing state of fatigue defect on the surface of a roller test specimen. Designed roller coupon surface fatigue defect monitoring systems based on machine vision technology are beneficial to acquire accurate and reliable material contact fatigue data, and have a very important meaning to implement industrial instrumentation, solve problems such as base part, base process, base material falling. Meanwhile, such systems can enhance the development facility and economic facility of key base component businesses such as bearings, gears, shafts, etc.

Figure 1:
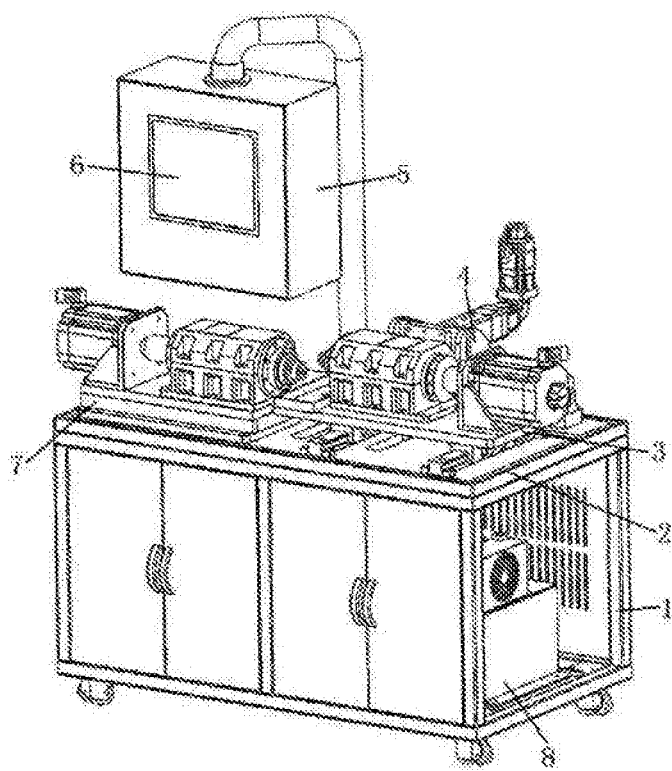
FIG. 1 is a mechanical part total layout of the contact fatigue testing system.
Figure 2:
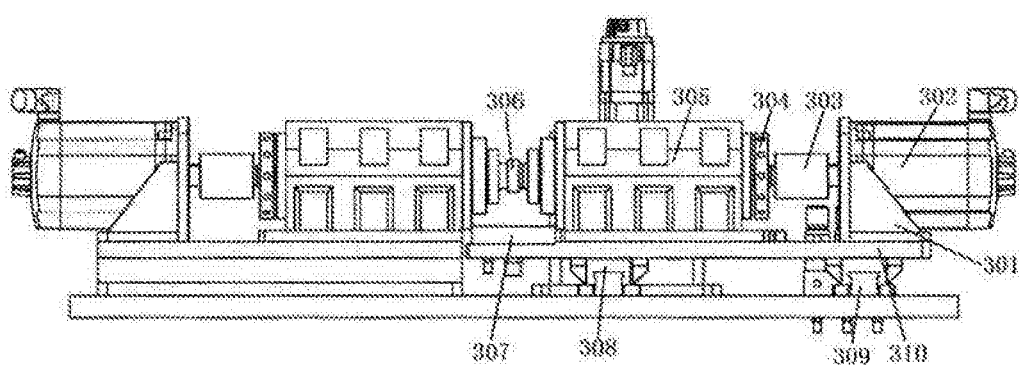
FIG. 2 is a front view of the main testing system and the subsidiary testing system.
Figure 3:
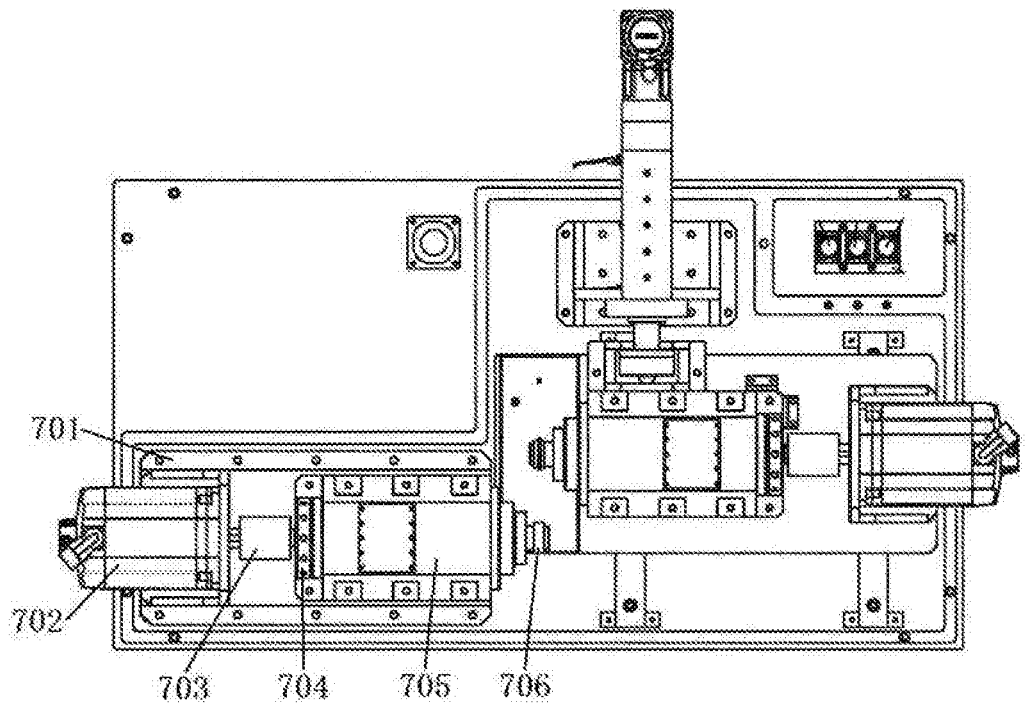
FIG. 3 is a top view of the main testing system and the subsidiary testing system.
Figure 4:
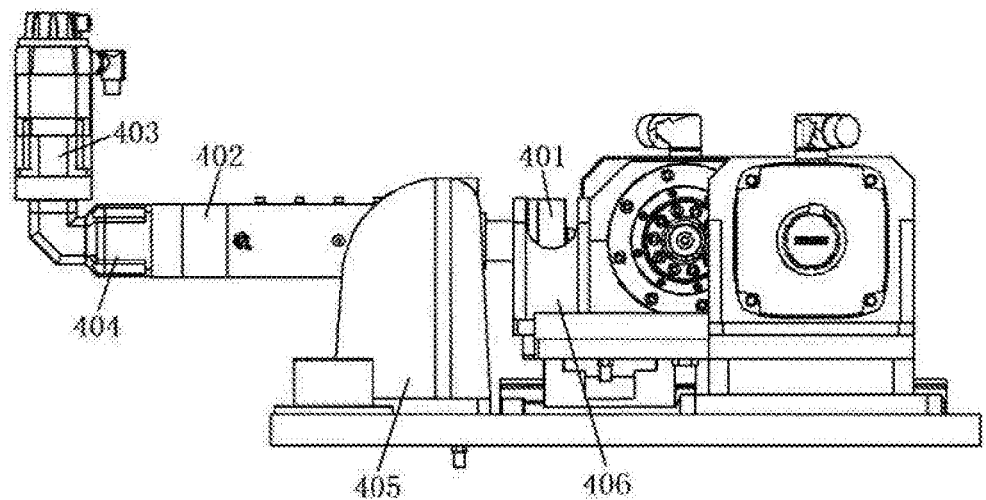
FIG. 4 is a left view of the main testing system and the subsidiary testing system.
Figure 5:
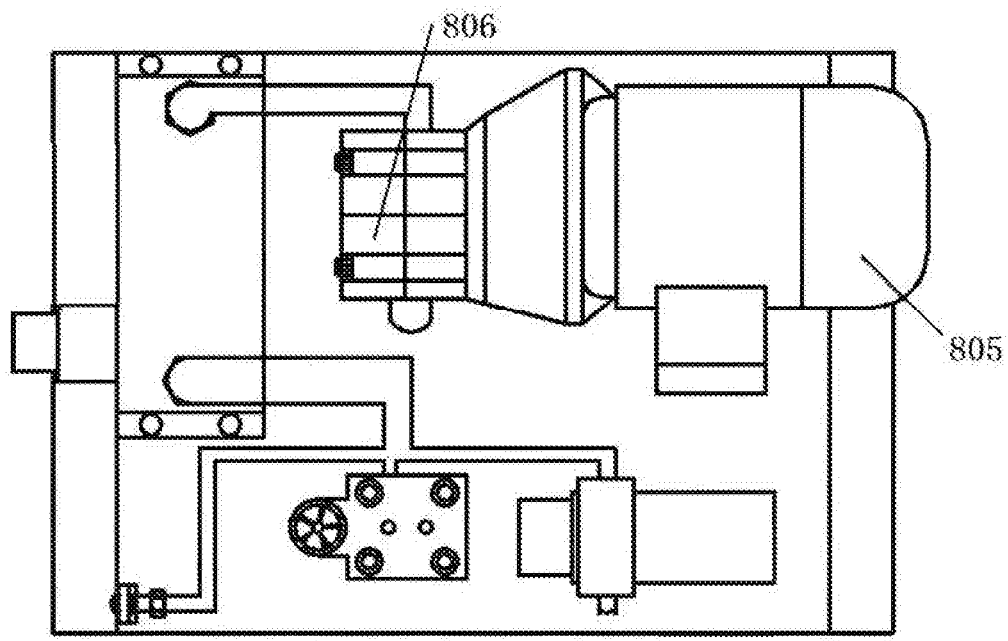
FIG. 5 is a top view of the lubrication system.
Figure 6:
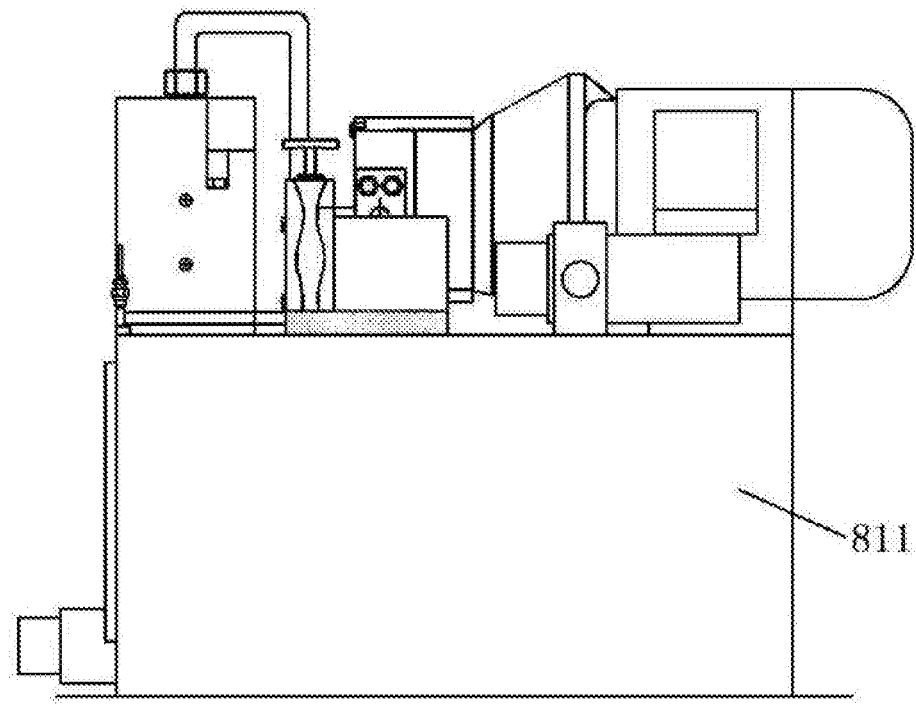
FIG. 6 is a front view of the lubrication system.
Figure 7:
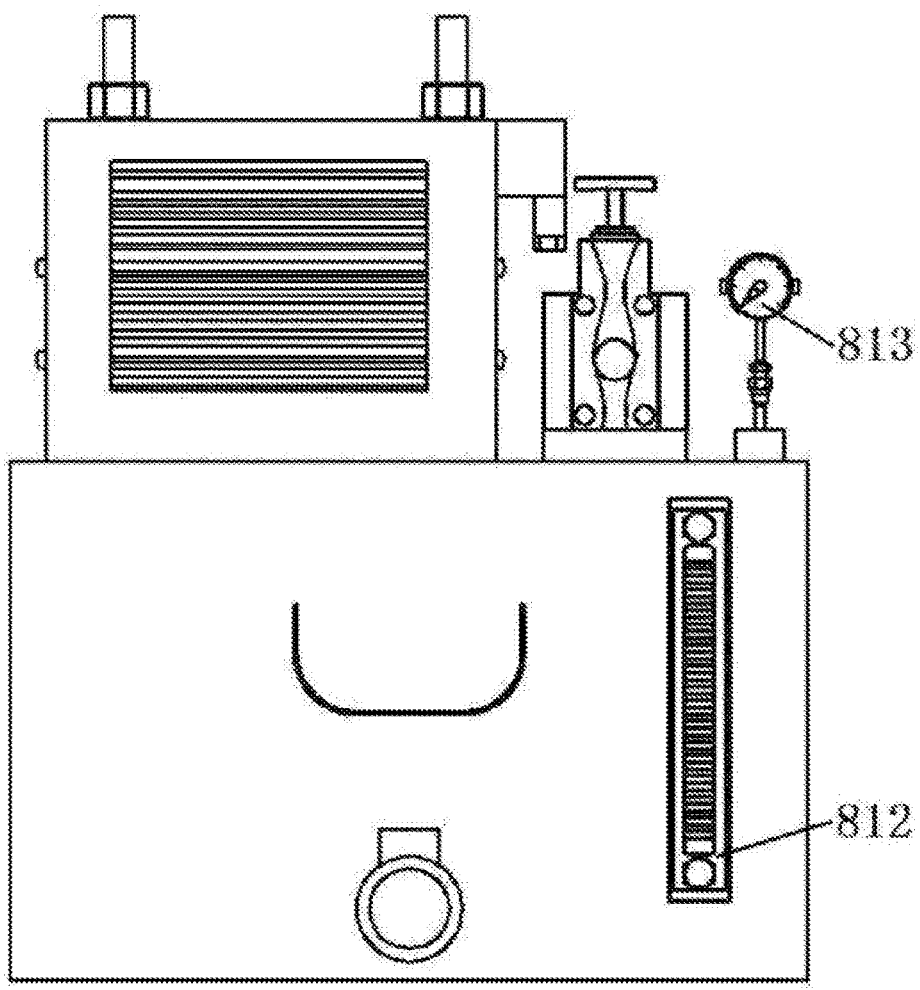
FIG. 7 is a left view of the lubrication system.

a main testing system base 301, a main testing shaft driving servo motor 302, a main testing shaft coupling 303, a main testing shaft rotating disc 304, a main testing box 305, a roller test specimen 306, a lubricating oil shell 307, a main testing system moving slider 308, a main testing system moving rail 309, a main testing box base 310, a main shaft A 3051, a skeleton oil seal IA 3052, a right end cover A 3053, a box cover A 3054, a bolt IA 3055, a box cover plate A 3056, a bearing NJ314A 3057, a bearing inner ring A 3058, and a bearing outer ring IA 3059; a sensor race A 30510, a shaft end connector A 30511, a bolt IIA 30512, a roller coupon mounting seat A 30513, a bolt IIIA 30514, a bolt IVA 30515, a left end cover A 30517, a skeletal oil seal IIA 30516, a copper retainer ring A 30518, a bearing NJ310A 30519, a bearing outer retainer ring IIA30520, a bolt VA30521, a lower box body A 30522, a bolt VIA 30523.

a pressure sensor 401, a servo cylinder 402, a servo cylinder driving motor 403, a right-angle speed reducer 404, a servo cylinder mounting base 405, and a main sample loading device 406;

a testing machine base 701, a subsidiary testing shaft driving servo motor 702, a subsidiary testing shaft coupling 703, a subsidiary testing shaft coupling 704, a subsidiary testing box 705, and a subsidiary testing piece 706;

a lubricating oil tank 811, an oil pump motor 805, an oil pump 806, a lubricating oil shell 307, an oil tank level gauge 812, a lubricating pipe pressure gauge 813;

a direct-current machine S1, a monitoring assistance device S2, a light source S3, a lens barrel S4, a CCD camera S5, a table S6, a camera mounting seat S7, a lens S8, an oil box S9, a bearing seat base S10, a transmission shaft S12, a direct-current machine seat S13, a lubricating oil shower head S201, a lubricating oil pipe S202, a vertical oil barrier S203, a top plate S204, a left side plate S205, a rear side plate S206, a roller test specimen 306, a right side plate S208, an inclined oil barrier S209, a rotating brush S210, and a front side plate S211.

DETAILED DESCRIPTION OF THE EMBODIMENTS

The present invention will be further described below with reference to the embodiments, but it should not be understood that the above subject matter is limited to the following embodiments. Without departing from the above technical idea of the present invention, various alternatives and modifications are made according to common technical knowledge and customary means in the art, and all should be included within the protection scope of the present invention.

Example 1

An intelligent rolling contact fatigue testing system mainly includes a main testing system 3, a loading system 4 and a subsidiary testing system 7.

The main testing system 3 and the subsidiary testing system 7 are provided on a same experimental platform.

The main testing system 3 mainly includes a main testing system base 301, a main testing shaft driving servo motor 302, a main testing box 305, a main testing system moving slider 308, a main testing system moving rail 309 and a main testing box base 310.

The main testing box 305 mainly includes a main shaft A 3051, two sealing end caps, a box body and a sensor race A 30510. The main shaft A 3051 is provided in the box body by using a bearing. Two ends of the box body are closed by sealing end covers with oil sealing. Two ends of the main shaft A 3051 pass through the sealing end covers at two ends of the box body, and one end of the main shaft A 3051 connects the main testing shaft driving servo motor 302, and the other end of the main shaft A 3051 is provided with a roller test specimen 306. The roller test specimen 306 is a metal cylinder, one end of the roller test specimen 306 has a connecting hole.

The sensor race A30510 is provided on one of the sealing end covers. An acceleration sensor is provided on the sensor race A30510. The acceleration sensor may be configured to measure vibration, and a bottom of the acceleration sensor to the sensor race A30510. The sensor race A30510 is concentric with the main shaft A3051. A bottom of the main testing box 305 is fixed to the main testing system base 301. The main testing system base 301 is provided on the main testing system moving rail 309 by a main testing system moving slider 308. The main testing system moving rail 309 is fixed on the experimental platform. A direction of the main testing box 305 along the main testing system moving rail 309 to slide is perpendicular to an axial direction of the main shaft A3051.

The subsidiary testing system 7 includes a subsidiary testing box 705, a subsidiary testing piece 706, a subsidiary testing box base 701 and an subsidiary testing shaft driving servo motor 702.

The subsidiary testing box 705 mainly includes a main shaft B 7051, two sealing end caps and a box body. The main shaft B 7051 is provided in the box body by using a bearing. Two ends of the box body are closed by sealing end covers with oil sealing. two ends of the main shaft B 7051 pass through the sealing end covers at two ends of the box body, and one end of the main shaft B 7051 connects the subsidiary testing shaft driving servo motor 702 and the other end of the main shaft B 7051 is provided with the subsidiary testing piece 706. The subsidiary testing box 705 is fixed on the experimental platform. A shape and size of the subsidiary testing piece 706 are the same as the roller test specimen 306. The loading system 4 mainly includes a servo cylinder 402 driven by a driving motor 403. In the embodiment, the driving motor 403 drives the servo cylinder 402 through the right-angle speed reducer 404. A mounting base 405 of the servo cylinder 402 is fixed on one side of the main testing system 3. A pressure sensor 401 is installed at a telescopic end of the servo cylinder 402. The pressure sensor 401 is in contact with the main testing box 305. When the servo cylinder 402 pushes the main testing box 305 to move along the main testing system moving rail 309, the pressure sensor 401 measures a load loaded on the main testing box 305. In the experiment, the loading system 4 pushes the main testing box 305 such that the subsidiary testing piece 706 contacts the roller test specimen 306. Both of the subsidiary testing piece 706 contacts the roller test specimen 306 are driven to scroll.

In an embodiment, the experimental platform includes a testing machine base 1. A main body part of the testing machine base 1 is a cabinet. A lower end of the cabinet is provided with a pulley, and an upper surface of the cabinet is a main/subsidiary testing box body base 2. The main/subsidiary testing box body base 2 is a horizontal platform.

In the embodiment, a box body of the main testing box 305 includes a box cover A3054, a box cover plate A 3056 and a lower box body A30522. The lower box body A30522 is hollow, and two ends of the lower box body A30522 are provided with a main shaft hole. The main shaft A3051, a plurality of bearings NJ314A3057 and a plurality of bearings NJ310A30519 are provided inside the lower box body A30522.

An upper end opening of the lower box body A 30522 is closed by the box cover A 3054. The box cover A 3054 is provided with an inspection hole. The inspection hole is closed by the box cover plate A 3056. The box cover plate A 3056 is fixed in a screw hole around the inspection hole by a bolt IA3055.

An outer ring of the bearing NJ314A 3057 and an outer ring of the bearing NJ310A 30519 are fixed in the lower box body A 30522. The main shaft A 3051 passes through and is fixed on an inner ring of the bearing NJ314A 3057 and an inner ring of the bearing NJ310A 30519.

One sealing end cap at left side of the two sealing end caps of the main testing box 305 includes a skeleton oil seal IA 3052 and a left end cover A 30516. A left side of the main shaft A 3051 passes through a central hole of the left end cover A 30516. The left end cover A 3053 closes a main shaft hole on a left side of the lower box body A 30522. The left end cover A30516 is fixed around the left main shaft hole of the lower box body A30522 by a bolt VIA 30523. One side of the left end cover A 30516 facing an inside of the main testing box 305 is provided with the skeleton oil seal IA 3052. The main shaft A 3051 passes through the skeletal oil seal IA 3052.

One sealing end cap at right side of the two sealing end caps of the main testing box 305 includes a skeleton oil seal IIA 30516 and a right end cover A 3053. A right side of the main shaft A 3051 passes through a central hole of the right end cover A 3053. The right end cover A 3053 closes a main shaft hole on a right side of the lower box body A 30522. The right end cover A3053 is fixed around the right main shaft hole of the lower box body A30522 by a bolt VA30521. One side of the right end cover A 3053 facing an inside of the main testing box 305 is provided with a skeleton oil seal IIA 30516. The main shaft A 3051 passes through the skeleton oil seal IIA 30516.

The main shaft A 3051 is provided with a roller test specimen 306 by a shaft end connector A 30511 and a roller coupon mounting seat A 30513. The shaft end connector A 30511 is a rotary body, which is sheathed at one end of the main shaft A 3051 by means of a keyway connection. The shaft end connector A 30511 rotates with the main shaft A 3051. A bolt IIA30512 is screwed into a rotating center of the shaft end connector A30511 and the main shaft A3051 in such a way as to connect both them together. The roller coupon mounting seat A 30513 is a rotary body, and one end of the roller coupon mounting seat A 30513 is connected to an end surface of the shaft end connector A 30511 by a bolt IIIA 30514 and the other end of the roller coupon mounting seat A 30513 fixes the roller test specimen 306. outer ring In the embodiment, the connecting holes of the roller test specimen 306 are nested in the mounting seat A30513, and the roller test specimen 306 and an end surface of the mounting seat A30513 both have an axial threaded hole coaxial with each other, and the roller test specimen 306 and the mounting seat A30513 can be connected by bolts.

The sensor race A30510 is a metal ring. The metal ring is fixed to the left end cap A30517 by bolts IVA30515. The shaft end connector A30511 passes through the metal ring. The shaft end connector A30511 is coaxial with the sensor race A30510, and a gap is formed by shaft end connector A30511 and the sensor race A30510.

The box body of the subsidiary testing box 705 includes a box cover B7054, a box cover plate B7056, and a lower box body B70522. The lower box body B70522 is hollow, and the two ends of the lower box body B70522 have a main shaft hole. A main shaft B7051, a plurality of bearings NJ314B7057 and a plurality of bearings NJ310670519 are provided inside the lower box body B70522.

An upper end opening of the lower box body B70522 is closed by the box cover B7054. The box cover B7054 has an inspection hole. The inspection hole is closed by the box cover plate B7056. The box cover plate B7056 is fixed in a screw hole around the inspection hole by a bolt IB 7055.

An outer ring of the bearing NJ314B7057 and an outer ring of the bearing NJ310670519 are fixed in the lower box body B70522. The main shaft B7051 passes through and is fixed on an inner ring of the bearing NJ314137057 and an inner ring of the bearing NJ310B70519.

One sealing end cap at left side of the two sealing end caps of the subsidiary testing box 705 includes a skeletal oil seal IB 7052 and a left end cover B 70516. The left side of the main shaft B 7051 passes through a central hole of the left end cover B 70516. The left end cover B 7053 closes a main shaft hole on a left side of the lower box body B 70522. The left end cover B70516 is fixed around the left main shaft hole of the lower box body B70522 by a bolt VIB 70523. One side of the left end cover B 70516 facing an inside of the subsidiary testing box 705 is provided with a skeletal oil seal IB 7052. the main shaft B 7051 passes through the skeletal oil seal IB 7052.

One sealing end cap at right side of the two sealing end caps of the subsidiary testing box 705 includes a skeletal oil seal IIB 70516 and a right end cover B 7053. A right side of the main shaft B 7051 passes through a central hole of the right end cover B 7053. The right end cover B 7053 closes a main shaft hole on a right side of the lower box body B 70522. The right end cover B7053 is fixed around the right main shaft hole of the lower box body B 70522 by the bolt VB70521. One side of the right end cover B 7053 facing an inside of the subsidiary testing box 705 is provided with a skeletal oil seal IIB 70516. The main shaft B 7051 passes through the skeletal oil seal IIB 70516.

The main shaft B 7051 is provided with a subsidiary testing piece 706 by a shaft end connector B 70511 and a roller coupon mounting seat B 70513. The shaft end connector B 70511 is a rotary body, which is sheathed at one end of the main shaft B 7051 by means of a keyway connection. The shaft end connector B 70511 rotates with the main shaft B 7051. A bolt IIB 70512 is screwed into a rotating center of the shaft end connector B70511, in such a way as to connect the shaft end connector B70511 and the main shaft B7051 together. The roller coupon mounting seat B 70513 is a rotary body, and one end of the roller coupon mounting seat B 70513 is connected to an end surface of the shaft end connector B 70511 by a bolt IIIB 70514 and the other end of the roller coupon mounting seat B 70513 is fixed to the subsidiary testing piece 706. In the embodiment, the connecting holes of the test specimen 706 are nested in the roller coupon mounting seat B 70513, and the subsidiary testing piece 706 and an end surface of the roller coupon mounting seat B 70513 both have an axial threaded hole coaxial with each other, and the subsidiary testing piece 706 and the roller coupon mounting seat B 70513 can be connected by bolts.

In the embodiment, the intelligent rolling contact fatigue testing system further includes a control box 5. The control box 5 controls the rotational speed, torque, etc. of the subsidiary testing shaft driving servo motor 702 and the main testing shaft driving servo motor 302.

In embodiments, a lubrication system is further included. The lubrication system includes a lubricating oil tank 811, an oil pump motor 805, an oil pump 806 and a lubricating oil shell 307.

The oil pump motor 805 drives the oil pump 806 such that a lubricating oil of the lubricating oil tank 811 is drawn out, and the lubricating oil tank 811 is provided with the lubricating oil for the main testing system 3, the loading system 4 and the subsidiary testing system 7.

An upper end of the lubricating oil shell 307 is open. The lubricating oil shell 307 is located below the roller test specimen 306. After the lubricating oil in the lubricating oil tank 811 is sprayed toward the roller test specimen 306, the lubricating oil is collected into the lubricating oil shell 307, and the lubricating oil is reflowed to the lubricating oil tank 811.

In the embodiment, the lubricating oil tank 811 has an oil tank level gauge 812 and a lubricating pipe pressure gauge 813.

Example 2

A rolling contact fatigue testing method based on the intelligent rolling contact fatigue testing system described in Embodiment 1.

Figure 13:
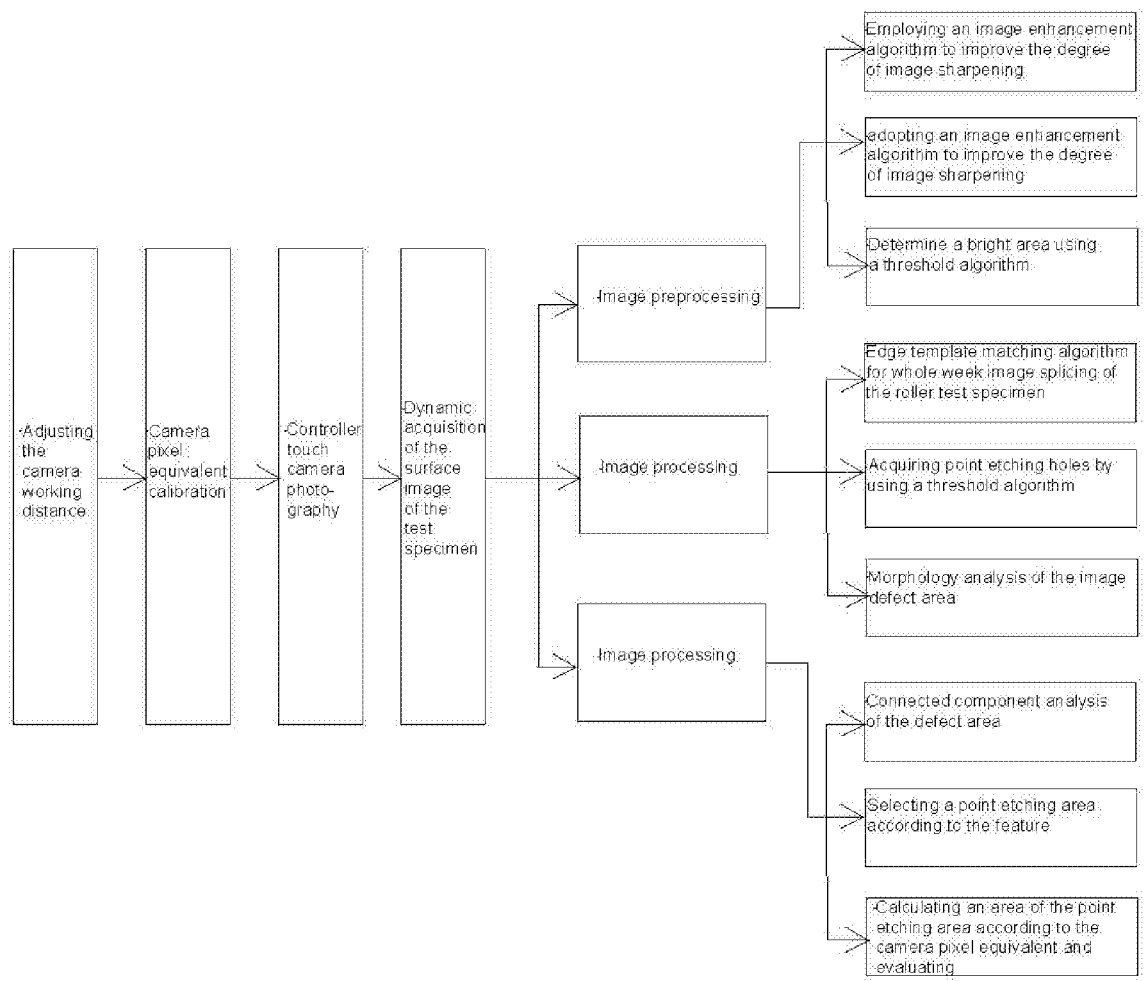
FIG. 13 is an acquisition process of surface image of roller test specimen.

Acquiring a fatigue defect image of the surface of the test specimen satisfying the test requirements is a key for performing accurate quantification evaluation on the surface of the roller test specimen. Based on the machine vision technology, the present invention establishes a surface fatigue defect image acquisition environment and system of a roller coupon satisfying the requirements of a rolling contact fatigue test using a CCD, a light source, a monitoring assistance device, and the like. Circumferentially stitching and processing the surface image of the sample by using a plurality of image processing algorithms and writing an image acquisition processing program, and obtaining an accurate etching area. Image acquisition and processing flowchart are shown in FIG. 13.

A testing device includes: a light source S3, a CCD camera S5 and a monitoring assistance device S2.

The light source S3 is an annular light source. The light source S3 surrounds a lens barrel S4 of the CCD camera S5. That is, a lens S8 of the CCD camera S5 is located at a center of the light source S3.

The monitoring assistance device S2 includes a box body, an oil box S9, a lubricating oil pipe S202, a vertical oil baffle S203, an inclined oil baffle S209 and a rotating brush S210.

The box body is consisted of a top plate S204, a left side plate S205, a rear side plate S206 and a front side plate S211. An opening of lower end of the box body is fastened to the oil box S9.

The left side plate S205 is provided an open pore. The CCD camera S5 and the light source S3 face an opening of the left side plate S205.

Two rotating shafts are provided on the rear side plate S206. The two rotating shafts are direct connected with a transmission shaft (S12) of a direct-current machine, and the two rotating shafts are simultaneously driven by the direct-current machine, both of which are rotationally opposite. The two rotating shafts respectively mount the roller test specimen 306 and the rotating brush S210. The roller test specimen 306 faces the CCD camera S5.

A lubricating oil shower head S201 and a vertical oil barrier S203 are provided on the top plate S204. The lubricating oil shower head S201 supplies oil through the lubricating oil pipe S202. The lubricating oil shower head S201 sprays oil to the roller test specimen 306. The rotating brush S210 brushes the lubricating oil on the surface of the roller test specimen 306. The vertical oil baffle plate S203 is located above the roller test specimen 306, and the vertical oil baffle plate S203 is located between the lubricating oil shower head S201 and the left side plate S205, so as to avoid the splashing of the lubricating oil affecting the operation of the CCD camera S5. One side of the inclined oil baffle plate S209 is connected to the rear side plate S206. The inclined oil baffle plate S209 is positioned below the roller test specimen 306, so that the lubricating oil brushed by the rotating brush S210 converges into the oil box S9 to avoid splashing, and is used again.

In the embodiment, the test device includes a table S6 and a camera mounting seat S7.

The oil box S9 and the camera mounting seat S7 are fixed to the table S6. The CCD camera S5 is provided on the camera mounting seat S7.

It can be seen from FIG. 13 that the basic flow of the roller test specimen surface image acquisition process is: Before the surface monitoring of the roller test specimen, the working distance of the camera needs to be adjusted firstly, equivalent calibration is performed on the camera pixels, and the camera is triggered to dynamic collect the surface image of the roller test specimen according to the number of pulses recorded by the single chip microcomputer, and an acquired image processing flow is divided into three steps.

Namely, when testing, the following steps are included:
1). using the intelligent rolling contact fatigue testing system, so that the roller test specimen 306 and the subsidiary testing piece 706 are in contact with each other and rolling with each other; in this process, a load measured by the pressure sensor 401 and a vibration data measured by the acceleration sensor are recorded;
2). installing the roller test specimen 306 in the monitoring assistance device S2 after a testing set time is completed, and rotating the roller test specimen 306 simultaneously with the rotating brush S210 in a state in which the lubricating oil is sprayed;
3). adjusting the CCD camera S5, and dynamically collecting a surface image of the roller test specimen 306;
4). image preprocessing: after adopting an image enhancement algorithm to improve the degree of image sharpening, a bright area is determined by using a threshold algorithm, and a ROI tile is obtained by, an area subtracting.
5). image processing: using an edge template matching algorithm for whole circumferential image splicing of the roller test specimen 306, using a threshold algorithm to acquire a point etching hole, and performing morphology analysis on an image defect area.
6). image post-processing: performing connected component analysis on the image defect area, selecting a point etching area according to the feature, calculating an area of the point etching area according to the camera pixel equivalent, and performing quantification evaluation on a fatigue failure state.

It is also understood that the roller test specimen is a cylindrical arc, surface and the optical path has radiation and diffuse reflection properties. Therefore, an optical path environment is established by using a low-angle annular optical film, and the camera pixel equivalent is calibrated, so as to acquire the actual size of a single pixel. The present system collects the pulses of the encoder through the STM 32 microcomputer and accumulates the pulses to a specified number and triggers the photographing outside.

Figure 14:
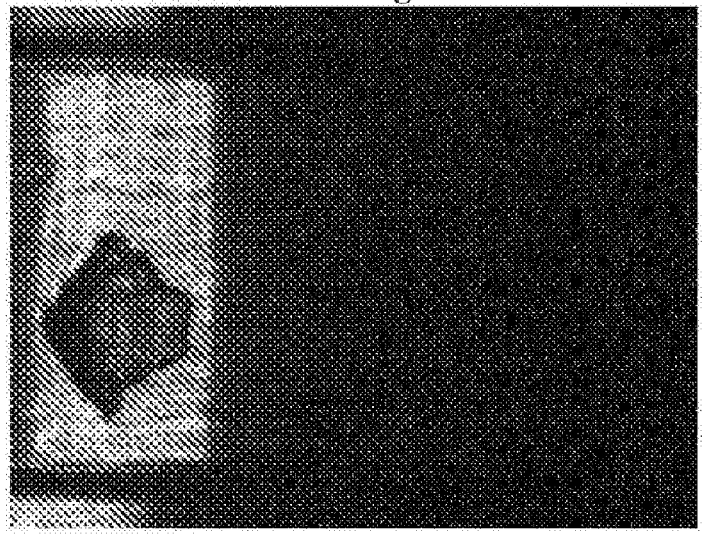
FIG. 14 is dynamically acquisition image.
Figure 15:
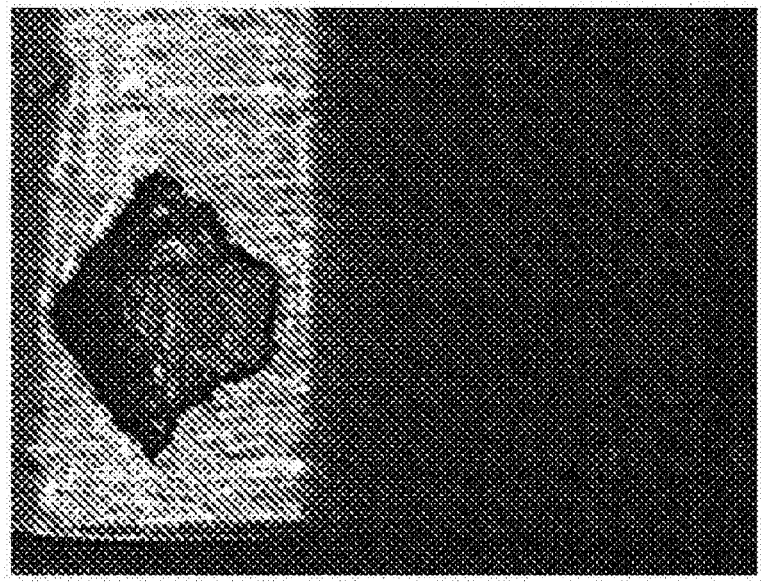
FIG. 15 is image enhancement effect diagram.

The dynamic image acquired by the camera (as shown in FIG. 14) improves the image sharpening degree by means of the image enhancement algorithm in the halcon software tool box, and the mathematical principle of sharpening is as follows:

Assuming that the original image matrix is X, the median filtered image matrix is Y, the contrast coefficient a, and the image matrix Z is output, the image enhancement principle formula is: $Z=((X-Y)*a)+X$, effect after image enhancement is shown in FIG. 15.

Figure 16:
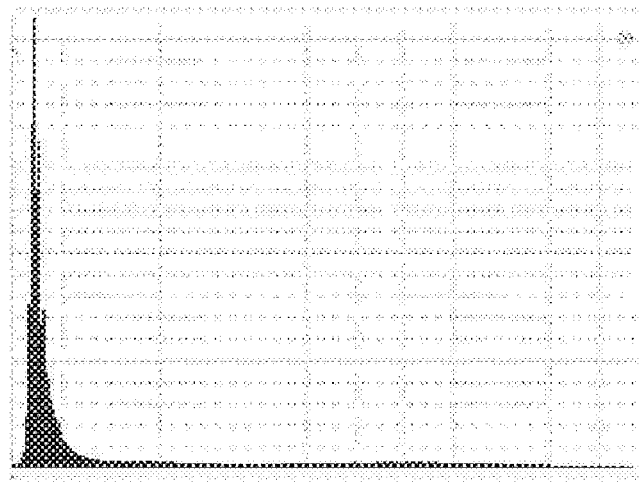
FIG. 16 is gradation characteristic histogram.
Figure 17:
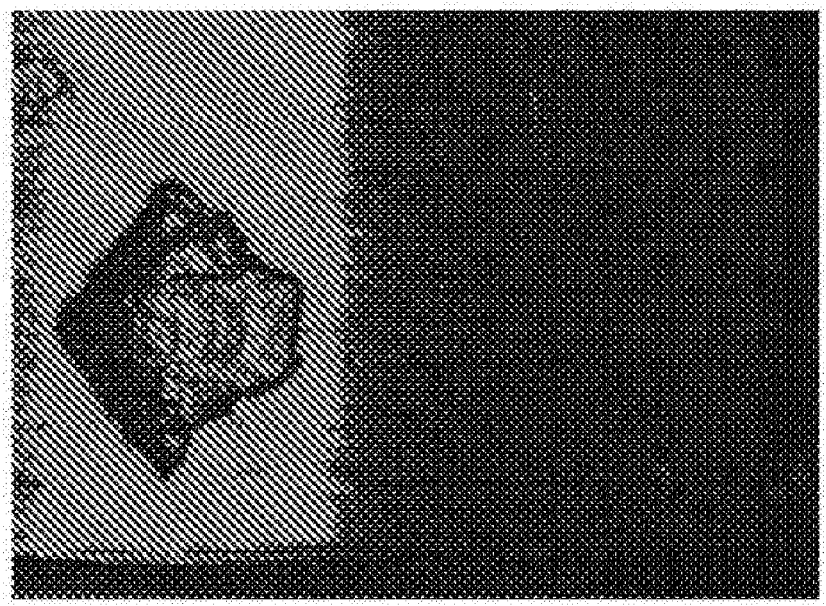
FIG. 17 is threshold processing.
Figure 18:
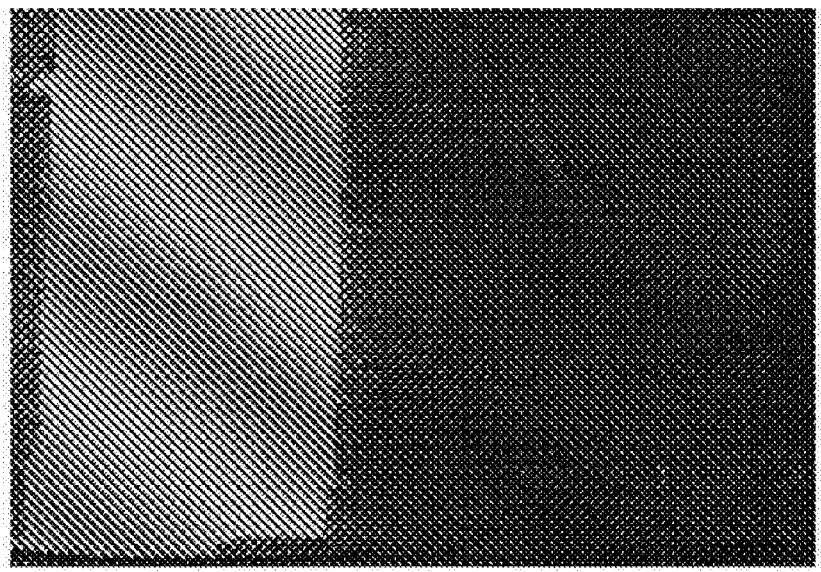
FIG. 18 is hole fill algorithm processing.

By analyzing the image gray scale feature histogram (as shown in FIG. 16), using a fixed threshold image segmentation algorithm based on chromatic aberration, the algorithm principle expression is:

$$p(x, y) = \begin{cases} 1 & Cn(x, y) \geq T0 \\ 0 & \text{otherwise} \end{cases}$$

Figure 8:
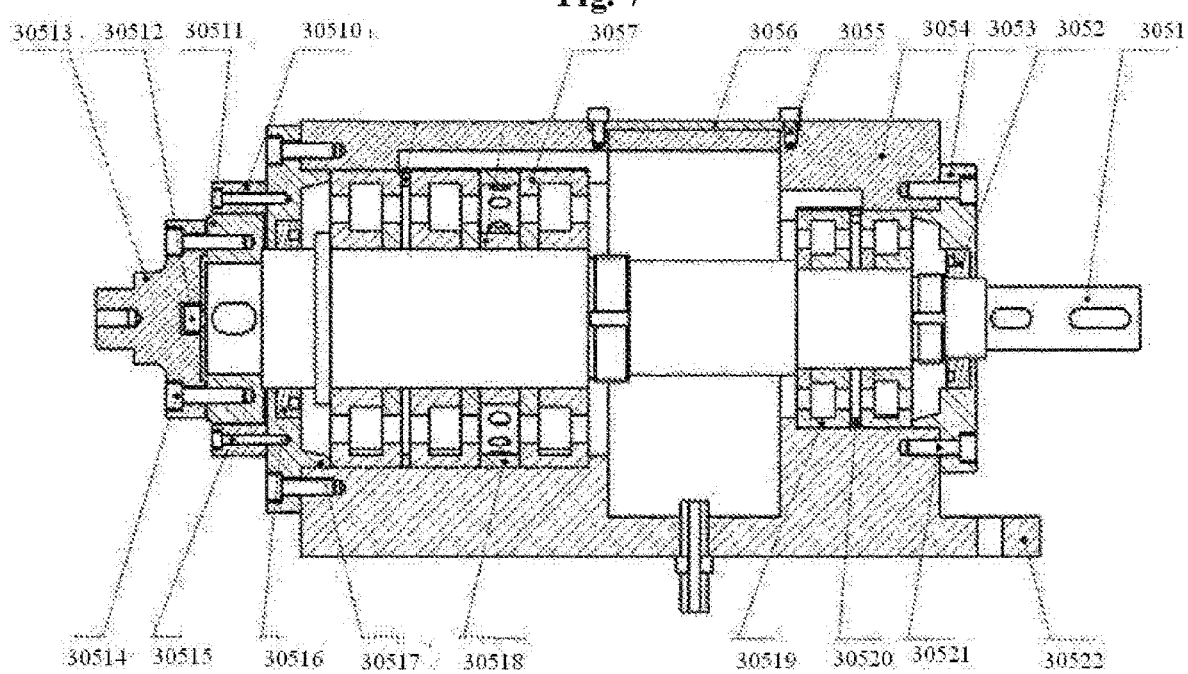
FIG. 8 is a structural diagram of the main testing box 305.
Figure 9:
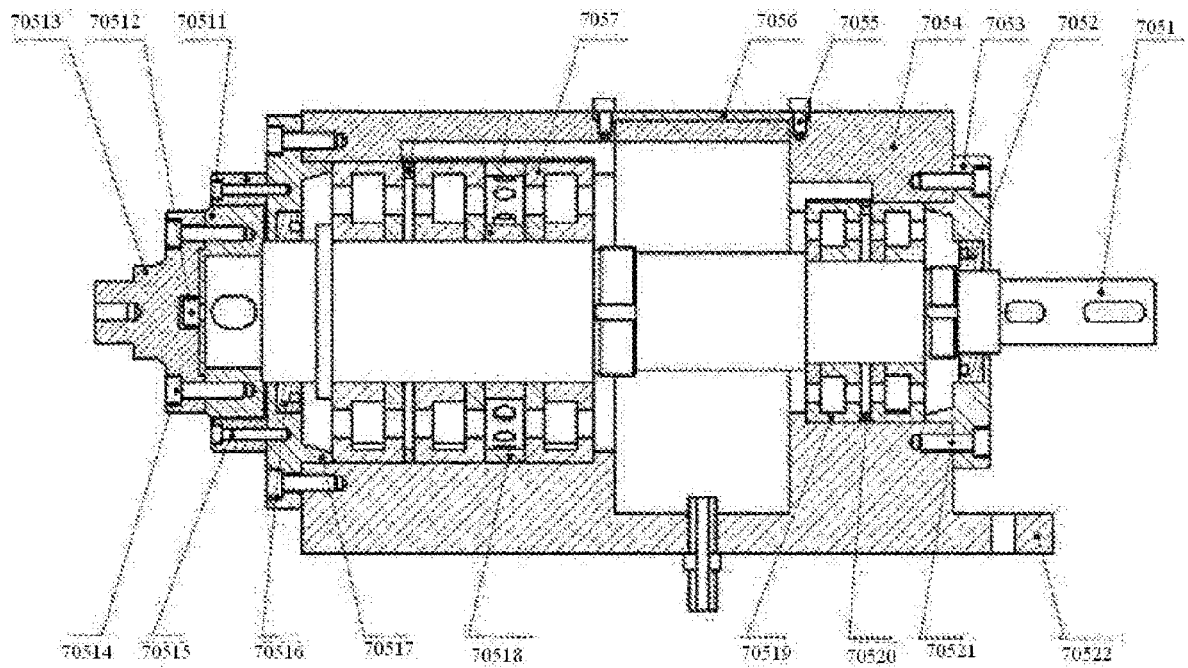
FIG. 9 is a structural diagram of the accompany testing box 705.
Figure 10:
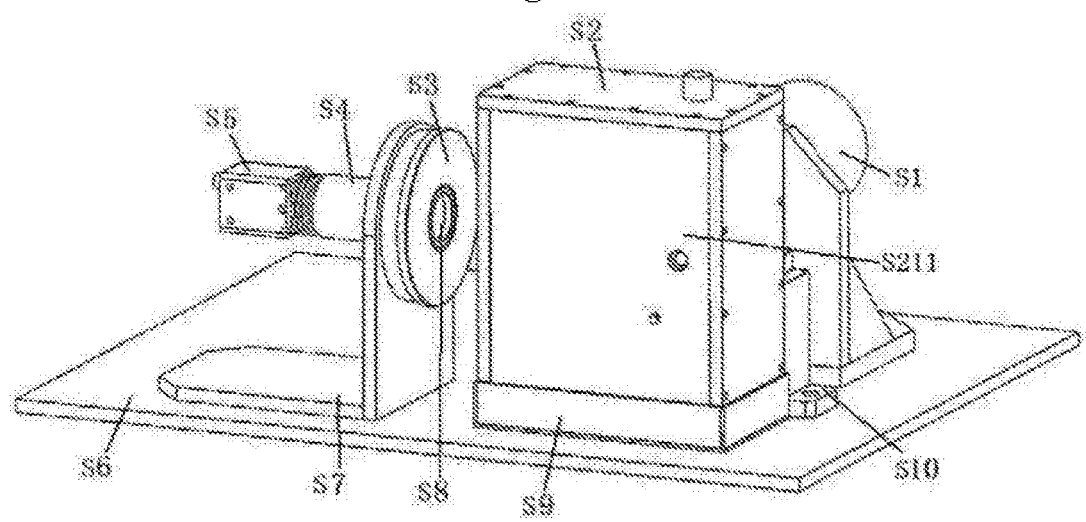
FIG. 10 is a monitoring system auxiliary device.
Figure 11:
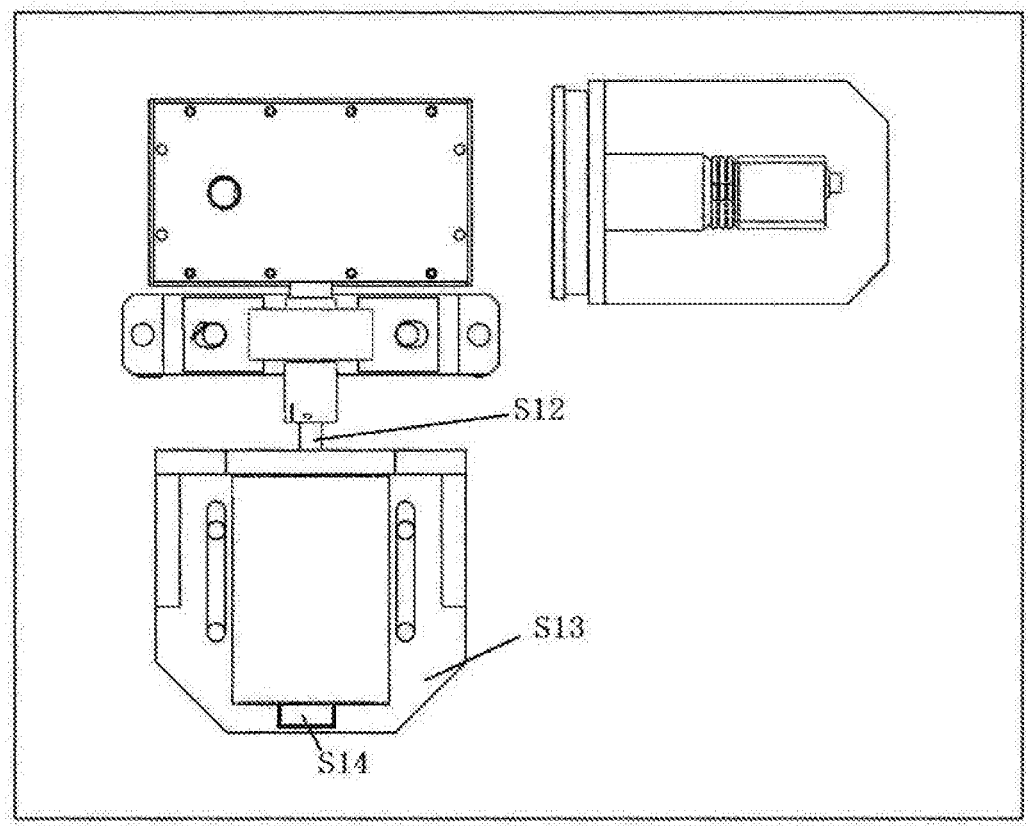
FIG. 11 is a top view of the monitoring system auxiliary device.
Figure 12:
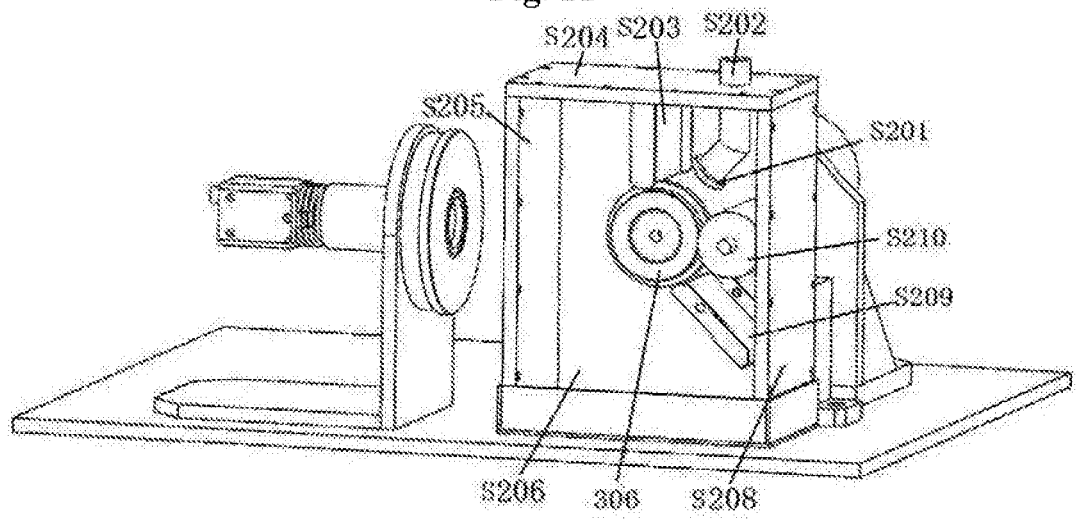
FIG. 12 is an internal structural diagram of the monitoring system auxiliary device.
Figure 19:
FIG. 19 is area subtraction.

Taking $T0=30$ as the critical value, the bright area is divided (as shown in FIG. 8). A complete bright area is obtained by using the bolb analysis (as in FIG. 9). The bright area image block is obtained by an area subtraction algorithm (as shown in FIG. 19), a common part of each image is selected as a template, an edge gray scale template matching algorithm is used to locate an area position of each image template, and then the common area is overlapped by using a radiation transformation algorithm, so as to realize splicing of the Roi area to obtain an image of the whole circumferential surface of the sample.

Figure 20:
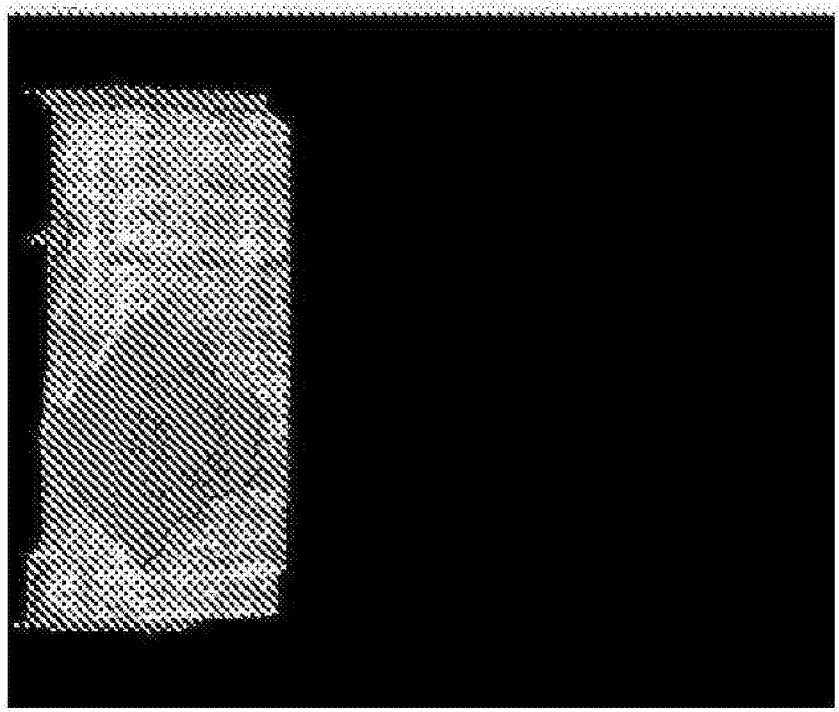
FIG. 20 is threshold processing results.
Figure 21:
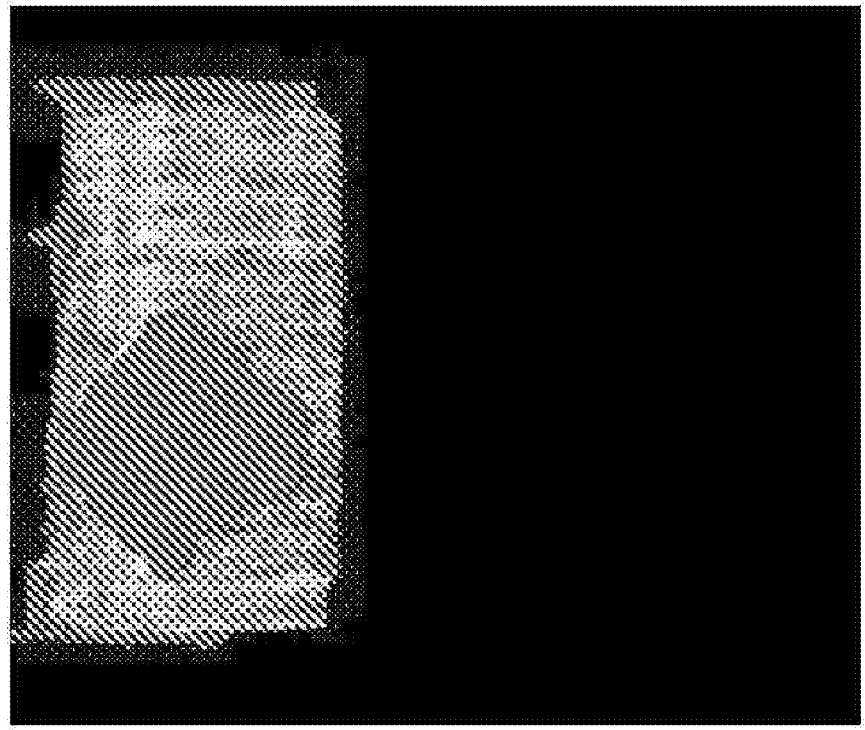
FIG. 21 is morphology analysis.
Figure 22:
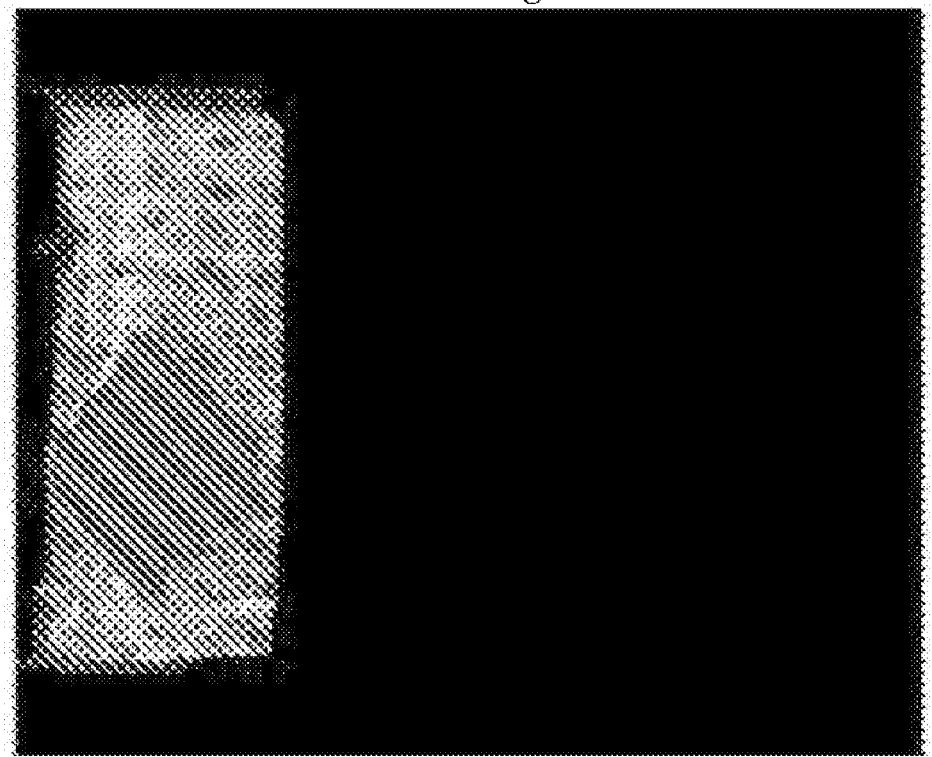
FIG. 22 is feature selecting.
Figure 23:
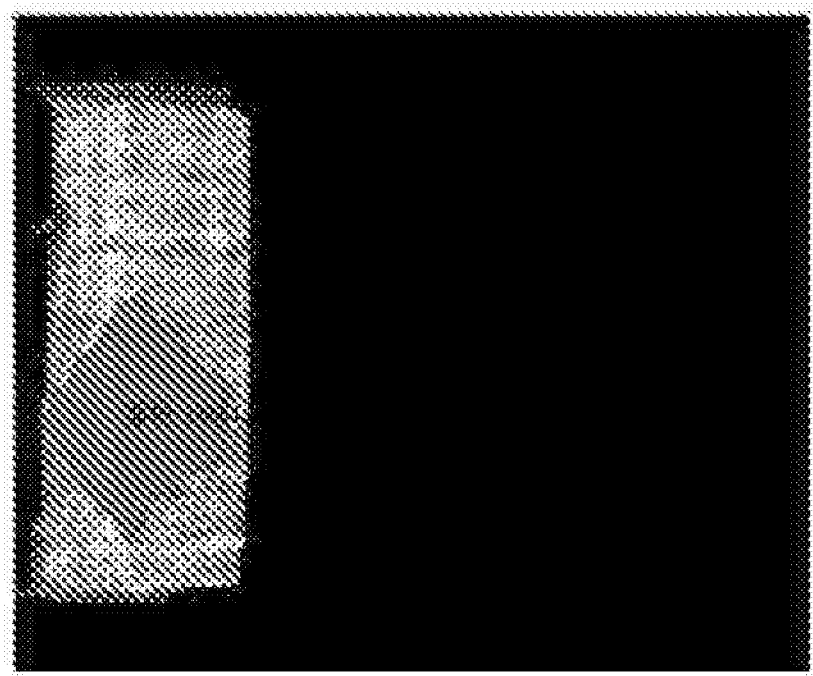
FIG. 23 is calculation of point etching holes area
In the figures: a testing machine base 1, a main/subsidiary testing box body base 2, a main testing system 3, a loading system 4, a control box 5, a touch display screen 6, a subsidiary testing system 7, and a testing machine lubrication system 8.

Perform threshold algorithm processing on the spliced images to acquire point etching hole portions (as shown in FIG. 20) of the images, and perform morphological processing on the extracted defect portions to obtain integrity of the defect portions (as shown in FIG. 21). An connected component analysis was performed on the area where the defect was extracted, and then the area and height characteristics of the area were used for the feature analysis on each area to pick out the defect portion of the sample (as shown in FIG. 22). Regional area pixel count 15354 (as in FIG. 23) was acquired using a regional area analysis algorithm.

The actual size of the regional area is obtained according to the calibration result, that is, the surface defect degree of the roller test specimen can be quantified.

What is claimed is:
1. An intelligent rolling contact fatigue testing system, wherein mainly comprising a main testing system (3), a loading system (4) and a subsidiary testing system (7);
the main testing system (3) and the subsidiary testing system (7) are provided on a same experimental platform;
the main testing system (3) mainly comprises a main testing system base (301), a main testing shaft driving servo motor (302), a main testing box (305), a main testing system moving slider (308), a main testing system moving rail (309) and a main testing box base (310);
the main testing box (305) mainly comprises a main shaft A (3051), two sealing end caps, a box body and a sensor race A (30510); the main shaft A (3051) is provided in the box body by using a bearing; two ends of the box body are closed by sealing end covers with oil sealing; two ends of the main shaft A (3051) pass through the sealing end covers at two ends of the box body, and one end of the main shaft A (3051) connects the main testing shaft driving servo motor (302), and the other end of the main shaft A (3051) is provided with a roller test specimen (306);

the sensor race A (30510) is provided on one of the sealing end covers; an acceleration sensor is provided on the sensor race A (30510); a bottom of the main testing box (305) is fixed on the main testing system base (301); the main testing system base (301) is provided on the main testing system moving rail (309) by using the main testing system moving slider (308); the main testing system moving rail (309) is fixed on the experimental platform; a direction of the main testing box (305) along the main testing system moving rail (309) to slide is perpendicular to an axial direction of the main shaft A (3051);

the subsidiary testing system (7) comprises a subsidiary testing box (705), a subsidiary testing piece (706), a subsidiary testing box base (701) and an subsidiary testing shaft driving servo motor (702);

the subsidiary testing box (705) mainly comprises, a main shaft B (7051), two sealing end caps and a box body; the main shaft B (7051) is provided in the box body by using a bearing; two ends of the box body are closed by sealing end covers with oil sealing; two ends of the main shaft B (7051) pass through the sealing end covers at two ends of the box body, and one end of the main shaft B (7051) connects the subsidiary testing shaft driving servo motor (702) and the other end of the main shaft B (7051) is provided with the subsidiary testing piece (706); the subsidiary testing box (705) is fixed on the experimental platform; a shape and size of the subsidiary testing piece (706) are the same as the roller test specimen (306);

the loading system (4) mainly comprises a servo cylinder (402) driven by a driving motor (403); a mounting base (405) of the servo cylinder (402) is fixed on one side of the main testing system (3); a pressure sensor (401) is installed at a telescopic end of the servo cylinder (402); the pressure sensor (401) is in contact with the main testing box (305); when the servo cylinder (402) pushes the main testing box (305) to move along the main testing system moving rail (300), the pressure sensor (401) measures a load loaded on the main testing box (305); in the experiment, the loading system (4) pushes the main testing box (305) such that the subsidiary testing piece (706) contacts the roller test specimen (306).

2. An intelligent rolling contact fatigue testing system as claimed in claim 1, wherein the experimental platform comprises a testing machine base (1); a main body part of the testing machine base (1) is a cabinet; a lower end of the cabinet is provided with a pulley, and an upper surface of the cabinet is a main/subsidiary testing box body base (2); the main/subsidiary testing box body base (2) is a horizontal platform.

3. An intelligent rolling contact fatigue testing system as claimed in claim 1, wherein a box body of the main testing box (305) comprises a box cover A (3054), a box cover plate A (3056) and a lower box body A (30522); the lower box body A (30522) is hollow, and two ends of the lower box body A (30522) have a main shaft hole; the main shaft A (3051), a bearing NJ314A (3057) and a bearing NJ310A (30519) are provided inside the lower box body A (30522);

an upper end opening of the lower box body A (30522) is closed by the box cover A (3054); the box cover A (3054) is provided with an inspection hole;

the inspection hole is closed by the box cover plate A (3056);

an outer ring of the bearing NJ314A (3057) and an outer ring of the bearing NJ310A (30519) are fixed in the lower box body A (30522); the main shaft A (3051) passes through and is fixed on an inner ring of the bearing NJ314A (3057) and an inner ring of the bearing NJ310A (30519);

one sealing end cap at left side of the two sealing end caps of the main testing box (305) comprises a skeleton oil seal IA (3052) and a left end cover A (30516); a left side of the main shaft A (3051) passes through a central hole of the left end cover A (30516); the left end cover A (3053) closes a main shaft hole on a left side of the lower box body A (30522); one side of the left end cover A (30516) facing an inside of the main testing box (305) is provided with the skeleton oil seal IA (3052); the main shaft A (3051) passes through the skeletal oil seal IA (3052);

one sealing end cap at right side of the two sealing end caps of the main testing box (305) comprises a skeleton oil seal IIA (30516) and a right end cover A (3053); a right side of the main shaft A (3051) passes through a central hole of the right end cover A (3053); the right end cover A (3053) closes a main shaft hole on a right side of the lower box body A (30522); one side of the right end cover A (3053) facing an inside of the main testing box (305) is provided with a skeleton oil seal IIA (30516); the main shaft A (3051) passes through the skeleton oil seal IIA (30516);

the main shaft A (3051) is provided with a roller test specimen (306) by a shaft end connector A (30511) and a roller coupon mounting seat A (30513);

the shaft end connector A (30511) is a rotary body, which is sheathed at one end of the main shaft A (3051) by means of a keyway connection; the shaft end connector A (30511) rotates with the main shaft A (3051); the roller coupon mounting seat A (30513) is a rotary body, and one end of the roller coupon mounting seat A (30513) is connected to an end surface of the shaft end connector A (30511) by a bolt IIIA (30514) and the other end of the roller coupon mounting seat A (30513) fixes the roller test specimen (306);

the box body of the subsidiary testing box (705) comprises a box cover B (7054), a box cover plate B (7056) and a lower box body B (70522); the lower box body B (70522) is hollow, and two ends of the lower box body B (70522) have a main shaft hole; a main shaft B (7051), a bearing NJ314B (7057) and a bearing NJ310B (70519) are provided inside the lower box body B (70522);

an upper end opening of the lower box body B (70522) is closed by the box cover B (7054); the box cover B (7054) has an inspection hole; the inspection hole is closed by the box cover plate B (7056);

an outer ring of the bearing NJ314B (7057) and an outer ring of the bearing NJ310B (70519) are fixed in the lower box body B (70522); The main shaft B (7051) passes through and is fixed on an inner ring of the bearing NJ314B (7057) and an inner ring of the bearing NJ310B (70519);

one sealing end cap at left side of the two sealing end caps of the subsidiary testing box (705) comprises a skeletal oil seal IB (7052) and a left end cover B (70516); a left side of the main shaft B (7051) passes through a central hole of the left end cover B (70516); the left end cover B (7053) closes a main shaft hole on a left side of the lower box body B (70522); one side of the left end cover B (70516) facing an inside of the subsidiary testing box (705) is provided with a skeletal oil seal IB (7052); the main shaft B (7051) passes through the skeletal oil seal IB (7052);

one sealing end cap at right side of the two sealing end caps of the subsidiary testing box (705) comprises a skeletal oil seal IIB (70516) and a right end cover B (7053); a right side of the main shaft B (7051) passes through, a central hole of the right end cover B (7053); the right end cover B (7053) closes a main shaft hole on a right side of the lower box body B (70522); one side of the right end cover B (7053) facing an inside of the subsidiary testing box (705) is provided with a skeletal oil seal IIB (70516); the main shaft B (7051) passes through the skeletal oil seal IIB (70516);

the main shaft B (7051) is provided with a subsidiary testing piece (706) by a shaft end connector B (70511) and a roller coupon mounting seat B (70513); the shaft end connector B (70511) is a rotary body, which is sheathed at one end of the main shaft B (7051) by means of a keyway connection; the shaft end connector B (70511) rotates with the main shaft B (7051); the roller coupon mounting seat B (70513) is a rotary body, and one end of the roller coupon mounting seat B (70513) is connected to an end surface of the shaft end connector B (70511) by a bolt III B (70514) and the other end of the roller coupon mounting seat B (70513) is fixed to the subsidiary testing piece (706).

4. An, intelligent rolling contact fatigue testing system as claimed in claim 1, wherein: further comprising a control box (5); the subsidiary testing shaft driving servo motor (702) and the main testing shaft driving servo motor (302) are controlled by the control box (5).

5. An intelligent rolling contact fatigue testing system as claimed in claim 1, wherein further comprising a lubrication system; the lubrication system comprises a lubricating oil tank (811), an oil pump motor (805), an oil pump (806) and a lubricating oil shell (307);

the oil pump motor (805) drives the oil pump (806), so that a lubricating oil of the lubricating oil tank (811) is drawn out, and the lubricating oil tank (811) is provided with the lubricating oil for the main testing system (3), the loading system (4) and the subsidiary testing system (7);

an upper end of the lubricating oil shell (307) is open; the lubricating oil shell (307) is located below the roller test specimen (306); after the lubricating oil in the lubricating oil tank (811) is sprayed into the roller test specimen (306), the lubricating oil is collected into the lubricating oil shell (307), and the lubricating oil is reflowed to the lubricating oil tank (811).

6. A rolling con tact fatigue testing method based on the intelligent rolling contact fatigue testing system as claimed in claim 1, wherein:

the intelligent rolling contact fatigue testing system comprises a testing device; the testing device comprises a light source (S3), a CCD camera (S5), and a monitoring assistance device (S2);

the light source (S3) is an annular light source; the light source (S3) surrounds a lens barrel (S4) of the CCD camera (S5);

the monitoring assistance device (S2) comprises a box body, an oil box (S9), a lubricating oil pipe (S202), a vertical oil baffle plate (S203), an inclined oil baffle plate (S209), and a rotating brush (S210);

the box body is consisted of a top plate (S204), a left side plate (S205), a rear side plate (S206) and a front side plate (S211); an opening of lower end of the box body is fastened on the oil box (S9);

the left side plate (S205) is provided an open pore; the COD camera (S5) and the light source (S3) face an opening of the left side plate (S205);

two rotating shafts are provided on the rear, side plate (S206); the two rotating shafts are direct connected with a transmission shaft (S12) of a direct-current machine, and the two rotating shafts are simultaneously driven by the direct-current machine; the two rotating shafts respectively mount a roller test, specimen (306) and a rotating brush (S210); the roller test specimen (306) facing the CCD camera (S5);

a lubricating oil shower head (S201) and a vertical oil baffle plate (S203) are provided on the top plate (S204); The lubricating oil shower head (S201) supplies oil by the lubricating oil pipe (S202); the vertical oil baffle plate (S203) is located above the roller test specimen (306), and the vertical oil baffle plate (S203) is located between the lubricating oil shower head (S201) and the left side plate (S205); one side of the inclined oil baffle plate (S209) is connected to the rear side plate (S206); the inclined oil baffle plate (S209) is located below the roller test specimen (306);

When testing, the rolling contact fatigue testing method comprises following steps:

1). using the intelligent rolling contact fatigue testing system, so that the roller test specimen (306) and the subsidiary testing piece (706) are in contact with each other and rolling with each other; in this process, a load measured by the pressure sensor (401) and a vibration data measured by the acceleration sensor are recorded;

2). installing the roller test specimen (306) in the monitoring assistance device (S2) after a testing set time is completed, and rotating the roller test specimen (306) simultaneously with the rotating brush (S210) in a state in which the lubricating oil is sprayed;

3). adjusting the CCD camera (S5), and dynamically collecting a surface image of the roller test specimen (306);

4). image preprocessing: after adopting an image enhancement algorithm to improve the degree of image sharpening, a bright area is determined by using a threshold algorithm, and a ROI tile is obtained by an area subtracting;

5). image processing: using an edge template matching algorithm for whole circumferential image splicing of the roller test specimen (306), using a threshold algorithm to acquire a point etching hole, and performing morphology analysis on an image defect area;

6). image post-processing: performing connected component analysis on the image defect area, selecting a point etching area according to the feature, calculating an area of the point etching area according to the camera pixel equivalent, and performing quantification evaluation on a fatigue failure state.

7. An intelligent rolling contact fatigue testing system as claimed in claim 2, wherein a box body of the main testing box (305) comprises a box cover A (3054), a box cover plate A (3056) and a lower box body A (30522); the lower box body A (30522) is hollow, and two ends of the lower box body A (30522) have a main shaft hole; the main shaft A (3051), a bearing NJ314A (3057) and a bearing NJ310A (30519) are provided inside the lower box body A (30522);

an upper end opening of the lower box body A (30522) is closed by the box cover A (3054); the box cover A (3054) is provided with an inspection hole; the inspection hole is closed by the box cover plate A (3056);

an outer ring of the bearing NJ314A (3057) and an outer ring of the bearing NJ310A (30519) are fixed in the lower box body A (30522); the main shaft A (3051) passes through and is fixed on an inner ring of the bearing NJ314A (3057) and an inner ring, of the bearing NJ310A (30519);

one sealing end cap at left side of the two sealing end caps of the main testing box (305) comprises a skeleton oil seal IA (3052) and a left end cover A (30516); a left side of the main shaft A (3051) passes through a central hole of the left end cover A (30516); the left end cover A (3053) closes a main shaft hole on a left side of the lower box body A (30522); one side of the left end cover A (30516) facing an inside of the main testing box (305) is provided with the skeleton oil seal IA (3052); the main shaft A (3051) passes through the skeleton oil seal IA (3052);

one sealing end cap at right side of the two sealing end caps of the main testing box (305) comprises a skeleton oil seal IIA (30516) and a right end cover A (3053); a right side of the main shaft A (3051) passes through a central hole of the right end cover A (3053); the right end cover A (3053) closes a main shaft hole on a right side of the lower box body A (30522); one side of the right end cover A (3053) facing an inside of the main testing box (305) is provided with a skeleton oil seal IIA (30516); the main shaft A (3051) passes through the skeleton oil seal IIA (30516);

the main shaft A (3051) is provided with a roller test specimen (306) by a shaft end connector A (30511) and a roller coupon mounting seat A (30513); the shaft end connector A (30511) is a rotary body, which is sheathed at one end of the main shaft A (3051) by means of a keyway connection; the shaft end connector A (30511) rotates with the main shaft A (3051); the roller coupon mounting seat A (30513) is a rotary body, and one end of the roller coupon mounting seat A (30513) is connected to an end surface of the shaft end connector A (30511) by a bolt IIIA (30514) and the other end of the roller coupon mounting seat A (30513) fixes the roller test specimen (306);

the box body of the subsidiary testing box (705) comprises a box cover B (7054), a box cover plate B (7056) and a lower box body B (70522); the lower box body B (70522) is hollow, and two ends of the lower box body B (70522) have a main shaft hole; a main shaft B (7051), a bearing NJ314B (7057) and a bearing NJ310B (70519) are provided inside the lower box body B (70522);

an upper end opening of the lower box body B (70522) is closed by the box cover B (7054); the box cover B (7054) has an inspection hole; the inspection hole is closed by the box cover plate B (7056);

an outer ring of the bearing NJ314B (7057) and an outer ring of the bearing NJ310B (70519) are fixed in the lower box body B (70522); The main shaft B (7051) passes through and is fixed on an inner ring of the bearing NJ314B (7057) and an inner ring of the bearing NJ310B (70519);

one sealing end cap at left side of the two sealing end caps of the subsidiary testing box (705) comprises a skeletal oil seal 113 (7052) and a left end cover B (70516); a left side of the main shaft B (7051) passes through a central hole of the left end cover B (70516); the left end cover B (7053) closes a main shaft hole on a left side of the lower box body B (70522); one side of the left end cover B (70516) facing an inside of the subsidiary testing box (705) is provided with a skeletal oil seal IB (7052); the main shaft B (7051) passes through the skeletal oil seal IB (7052);

one sealing end cap at right side of the two sealing end caps of the subsidiary testing box (705) comprises a skeletal oil seal IIB (70516) and a right end cover B (7053); a right side of the main shaft B (7051) passes through a central hole of the right end cover B (7053); the right end cover B (7053) closes a main shaft hole on a right side of the lower box body B (70522);

one side of the right end cover B (7053) facing an inside of the subsidiary testing box (705) is provided with a skeletal oil seal IIB (70516); the main shaft B (7051) passes through the skeletal oil seal 11B (70516);

the main shaft B (7051) is provided with a subsidiary testing piece (706) by a shaft end connector B (70511) and a roller coupon mounting seat B (70513); the shaft end connector B (70511) is a rotary body, which is sheathed at one end of the main shaft B (7051) by means of a keyway connection; the shaft end connector B (70511) rotates with the main shaft B (7051); the roller coupon mounting seat B (70513) is a rotary body, and one end of the roller coupon mounting seat B (70513) is connected to an end surface of the shaft end connector B (70511) by a bolt IIIB (70514) and the other end of the roller coupon mounting seat B (70513) is fixed to the subsidiary testing piece (706).

8. An intelligent rolling contact fatigue testing system as claimed in claim 3, wherein: further comprising a control box (5); the subsidiary testing shaft driving servo motor (702) and the main testing shaft driving servo motor (302) are controlled by the control box (5).

9. An intelligent rolling contact fatigue testing system as claimed in claim 3, wherein further comprising a lubrication system; the lubrication system comprises a lubricating oil tank (811), an oil pump motor (805), an oil pump (806) and a lubricating oil shell (307);

the oil pump motor (805) drives the oil pump (806), so that a lubricating oil of the lubricating oil tank (811) is drawn out, and the lubricating oil tank (811) is provided with the lubricating oil for the main testing system (3), the loading system (4) and the subsidiary testing system (7);

an upper end of the lubricating oil shell (307) is open; the lubricating oil shell (307) is located below the roller test specimen (306); after the lubricating oil in the lubricating oil tank (811) is sprayed into the roller test specimen (306), the lubricating oil is collected into the lubricating oil shell (307), and the lubricating oil is reflowed to the lubricating oil tank (811).

* * * * *